US009232375B1

(12) United States Patent
Fox

(10) Patent No.: US 9,232,375 B1
(45) Date of Patent: *Jan. 5, 2016

(54) MOBILE VOICE SELF SERVICE SYSTEM

(71) Applicant: West Corporation, Omaha, NE (US)

(72) Inventor: Chad Daniel Fox, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 446 days.

This patent is subject to a terminal disclaimer.

(21) Appl. No.: 13/667,359

(22) Filed: Nov. 2, 2012

Related U.S. Application Data

(63) Continuation of application No. 12/138,476, filed on Jun. 13, 2008, now Pat. No. 8,311,837.

(51) Int. Cl.
G10L 15/00 (2013.01)
G10L 21/00 (2013.01)
H04W 4/18 (2009.01)
G10L 13/00 (2006.01)

(52) U.S. Cl.
CPC ............... H04W 4/18 (2013.01); G10L 13/00 (2013.01); G10L 15/00 (2013.01); H04M 2203/2011 (2013.01)

(58) Field of Classification Search
CPC ....... G10L 13/00; G10L 13/043; G10L 15/00; G10L 15/30; G10L 2013/00; H04W 4/18; H04M 2203/2011
USPC .......... 704/270, 270.1, 275; 379/88.01–88.17
See application file for complete search history.

(56) References Cited

U.S. PATENT DOCUMENTS

| 6,546,096 | B1 | 4/2003 | Meiden et al. |
| 6,804,330 | B1 | 10/2004 | Jones et al. |
| 6,934,756 | B2 * | 8/2005 | Maes ............................ 709/227 |
| 7,028,306 | B2 * | 4/2006 | Boloker et al. ............... 719/310 |
| 7,054,818 | B2 * | 5/2006 | Sharma et al. ................ 704/270 |
| 7,099,442 | B2 * | 8/2006 | Da Palma et al. .......... 379/88.22 |
| 7,130,401 | B2 | 10/2006 | Rampey et al. |
| 7,174,297 | B2 * | 2/2007 | Guerra et al. ............... 704/270.1 |
| 7,216,351 | B1 * | 5/2007 | Maes ............................ 719/328 |
| 7,308,083 | B2 * | 12/2007 | Bettis et al. ................. 379/88.17 |
| 7,412,038 | B2 * | 8/2008 | Creamer et al. ............ 379/88.13 |
| 7,436,939 | B1 * | 10/2008 | Packingham et al. ...... 379/88.12 |
| 7,529,675 | B2 | 5/2009 | Maes |
| 7,558,252 | B2 | 7/2009 | Shen et al. |
| 7,571,100 | B2 * | 8/2009 | Lenir et al. ................. 704/270.1 |

(Continued)

Primary Examiner — Paras D Shah
(74) Attorney, Agent, or Firm — Raffi Gostanian

(57) ABSTRACT

A Mobile Voice Self Service (MVSS) mobile system that includes an MVSS mobile device, on which a VoiceXML browser is implemented directly. The VoiceXML browser may request a VoiceXML application from a VoiceXML application server and process it. A client system may include the VoiceXML application server that the VoiceXML application is requested from. Upon request, the VoiceXML application may deliver the requested VoiceXML application to the VoiceXML application browser. A vendor media resource system may provide advanced Media Resource Control Protocol (MRCP) services, such as Automatic Speech Recognition (ASR) or Text-To-Speech (TTS), to the VoiceXML application that is being processed by the VoiceXML application browser. A call data manager may also be implemented on the MVSS mobile device and may provide call data that, in conjunction with data from the VoiceXML application server, may authorize access to advanced Media Resource Control Protocol (MRCP) services.

9 Claims, 5 Drawing Sheets

(56) References Cited

U.S. PATENT DOCUMENTS

| | | | |
|---|---|---|---|
| 7,687,425 B2* | 3/2010 | Storck et al. | 502/102 |
| 7,689,425 B2 | 3/2010 | Kim et al. | |
| 7,698,435 B1 | 4/2010 | Paterik et al. | |
| 7,715,547 B2* | 5/2010 | Ibbotson et al. | 379/265.02 |
| 8,107,598 B2* | 1/2012 | Skakkebaek et al. | 379/88.13 |
| 2002/0095473 A1* | 7/2002 | Berkowitz et al. | 709/217 |
| 2002/0193997 A1* | 12/2002 | Fitzpatrick et al. | 704/270 |
| 2003/0125958 A1* | 7/2003 | Alpdemir et al. | 704/275 |
| 2003/0184658 A1 | 10/2003 | Selin et al. | |
| 2003/0187658 A1* | 10/2003 | Selin et al. | 704/270.1 |
| 2003/0225825 A1* | 12/2003 | Healey et al. | 709/203 |
| 2004/0196965 A1 | 10/2004 | Birger et al. | |
| 2004/0230637 A1* | 11/2004 | Lecoueche et al. | 709/200 |
| 2005/0137875 A1* | 6/2005 | Kim et al. | 704/270.1 |
| 2005/0234727 A1* | 10/2005 | Chiu | 704/270.1 |
| 2006/0098792 A1* | 5/2006 | Frank et al. | 379/70 |
| 2006/0177023 A1* | 8/2006 | Vaghar et al. | 379/88.17 |
| 2007/0150902 A1* | 6/2007 | Meyer et al. | 719/313 |
| 2008/0084989 A1 | 4/2008 | Dhanakshirur | |
| 2008/0317232 A1 | 12/2008 | Couse et al. | |
| 2009/0034695 A1* | 2/2009 | Newton | 379/88.17 |
| 2009/0171659 A1* | 7/2009 | Pearce et al. | 704/235 |

* cited by examiner

MOBILE VOICE SELF SERVICE SYSTEM

CROSS-REFERENCE TO RELATED APPLICATIONS

The present patent application is a continuation of and claims priority from patent application Ser. No. 12/138,476, titled MOBILE VOICE SELF SERVICE SYSTEM, filed Jun. 13, 2008, the entire contents of which are enclosed by reference herein.

BACKGROUND OF THE INVENTION

The present invention relates to a Mobile Voice Self Service (MVSS) system for processing an application via an application browser that is implemented on a mobile device. More particularly, the present invention relates to an MVSS system for processing a VoiceXML application via a VoiceXML application browser implemented directly on an MVSS mobile device.

In telephony, Interactive Voice Response (IVR) is a technology that allows a computer to detect voice and touch tones in a telephone call.

Many companies employ systems based on IVR technology to process and route telephone calls originating from their respective customers. Examples include telephone banking, televoting, and credit card transactions. IVR systems are typically used to service high call volumes, reduce cost and improve the customer experience.

If a customer dials a telephone number that is answered by an IVR system, the system executes an application that responds to the customer/caller with pre-recorded or dynamically generated audio files. These audio files explain the options available to the caller and direct the caller on how to proceed. The caller selects an option by using spoken words or Dual-Tone Multi-Frequency (DMTF) tones, e.g., telephone keypad touch tones.

Modern IVR applications are structured similar to World Wide Web pages, using languages such as VoiceXML. Other languages may include, for example, SALT or T-XML.

Since many companies do not have their own IVR platforms, they typically turn to outsourcing companies or vendors to either host their VoiceXML application or manage the application as a whole. An example of such a hosted environment is shown in FIG. 1.

The hosted environment shown in FIG. 1 may include end user devices, such as a mobile device 105 or a land-line phone 110; hosted vendor systems 115; and client systems 120. The mobile device 105, such as a cellular phone, PDA, or iPhone, and/or the land-line phone 110 may communicate with the hosted vendor systems 115 via a telephony interface 125. The telephony interface 125, in turn, interacts with a VoiceXML browser 130, a MRCP TTS Server 135, and a MRCP Speech Recognition Server 140, all of which are part of the hosted vendor systems 115.

The VoiceXML browser 130 may be an extension of a web browser that presents an interactive voice user interface to the user and that operates on pages that specify voice dialogs. These pages may be written in VoiceXML language, which is the W3C's standard voice dialog markup language, but other proprietary voice dialog languages may be used. The VoiceXML browser 130 may present information aurally, using pre-recorded audio file playback or using Text-To-Speech (TTS) software to render textual information as audio. Further, the VoiceXML browser 130 may obtain information from the end user of the mobile device 105 and/or the land-line phone 110 by speech recognition and keypad entry, e.g., DTMF detection.

The VoiceXML browser 130 interacts with the MRCP TTS Server 135 and the MRCP Speech Recognition Server 140. MRCP stands for Media Resource Control Protocol, which is a communication protocol that allows speech servers to provide various speech services, such as speech recognition, speech synthesis, and TTS to its clients. The MRCP TTS Server 135 provides TTS services to its clients, and the MRCP Speech Recognition Server 140 provides speech recognition services to its clients.

Computer Telephone Integration (CTI) data are sent from the hosted vendor systems 115 to a CTI Management Server 145. CTI is a technology that allows interactions on a telephone and a computer to be integrated or coordinated. As contact channels have expanded from voice to email, web, and fax, CTI has expanded to include the integration of all customer contact channels (voice, email, web, fax, etc.) with computer systems. Common functions that may be implemented using CTI are, for example, call routing, call information display with or without using calling line data, phone control (answer, hang up, hold, conference, etc.), automatic dialing and computer-controlled dialing, etc.

Furthermore, application requests are sent from the VoiceXML Browser 130 to a VoiceXML Application Server 150, and the requested VoiceXML application is delivered from the VoiceXML Application Server 150 to the VoiceXML Server 130. The CTI Management Server 145 and the VoiceXML Application Server 150 are both part of the client systems 120.

More and more people use intelligent mobile devices, such as cellular phones, PDAs, or iPhones, as a means of communication. These intelligent mobile devices become more and more sophisticated due to, for example, increased computing power or memory capacity, and due to, for example, the availability of mobile Software Development Kits (SDKs), such as Java Platform, Micro Edition (Java ME) or Apple's iPhone SDK. This may lead to decreased reliance on teleservices companies that are built on standard telephony technology. More particularly, this may lead to decreased reliance on hosted environments for IVR applications, for example.

BRIEF SUMMARY OF THE INVENTION

The present invention, in exemplary embodiments, overcomes the above disadvantages and other disadvantages not described above. Also, the present invention is not required to overcome the disadvantages described above, and an exemplary embodiment of the present invention may not overcome any of the problems described above.

Thus, in one aspect, the present invention is directed to a Mobile Voice Self Service (MVSS) system that includes an MVSS mobile device, a client system, and a vendor media resource system. The MVSS mobile device has an application browser to request and process an application. The client system has an application server to deliver the requested application to the application browser. The vendor media resource system provides advanced Media Resource Control Protocol (MRCP) services to the application that is being processed by the application browser.

In another aspect, the present invention is directed to an MVSS hosted vendor system that includes a MRCP Speech Recognition Server, a MRCP TTS Server, and a Media Resource Gateway. The MRCP Speech Recognition Server provides Automatic Speech Recognition (ASR) services to an application browser that is implemented on an MVSS mobile device and that processes an application. The MRCP TTS Server provides Text-To-Speech (TTS) services to the application browser, and the Media Resource Gateway facilitates communication of the MRCP Speech Server and/or the MRCP TTS Server with the application browser.

In yet another aspect, the present invention is directed to a method for incorporating image map interactions to accept user input in a VoiceXML application. A Uniform Resource Locator (URL) is embedded within a VoiceXML document, and the URL loads a fragment of HTML code that represents an image and an accompanying image map defined via a map HTML tag.

The present invention may allow companies requiring only a basic, DTMF-only IVR application to host their VoiceXML application on their existing web infrastructure and provide users of mobile devices access to the same IVR functionality that would normally need to be provided by an outsourced vendor. Companies requiring more advanced features as part of their IVR application may still benefit from the present invention by moving the call handling and VoiceXML processing off of a hosted platform and only using an outsourced vendor to perform advanced features such as speech recognition, natural language, or text-to-speech. Alternatively, the present invention may allow companies to move both basic, DTMF-only IVR applications and IVR applications with advanced features off of the hosted platform to their existing web infrastructure.

BRIEF DESCRIPTION OF THE SEVERAL VIEWS OF THE DRAWING

In the following section, the invention will be described with reference to exemplary embodiments illustrated in the attached Figures, in which.

DETAILED DESCRIPTION OF THE INVENTION

Reference will now be made in detail to exemplary embodiments of the present invention, examples of which are illustrated in the accompanying drawings.

Given the rapidly increasing processing power of mobile devices and the availability of mobile SDKs, a hosted application browser of the related art, such as a hosted VoiceXML browser, may be moved directly to an end user's mobile device. In other words, an application browser, such as a VoiceXML browser, and other, associated components may be deployed as a mobile application and implemented on the mobile device to allow a VoiceXML application to be processed directly on the mobile device. This concept may also be known as Mobile Voice Self Service (MVSS).

MVSS may provide the benefit of reduced cost or, in the case of simple applications, no hosting cost to companies, for example. In addition, the end-user features that MVSS provides may allow applications to become more user-friendly.

Figure 1:
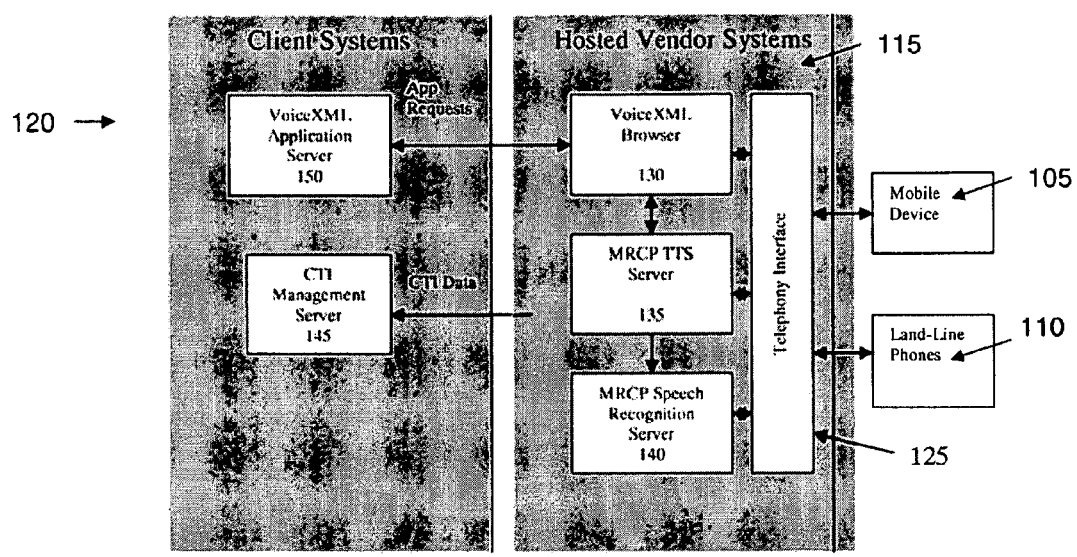
FIG. 1 illustrates a hosted environment for IVR applications as it may be known in the related art.
Figure 2:
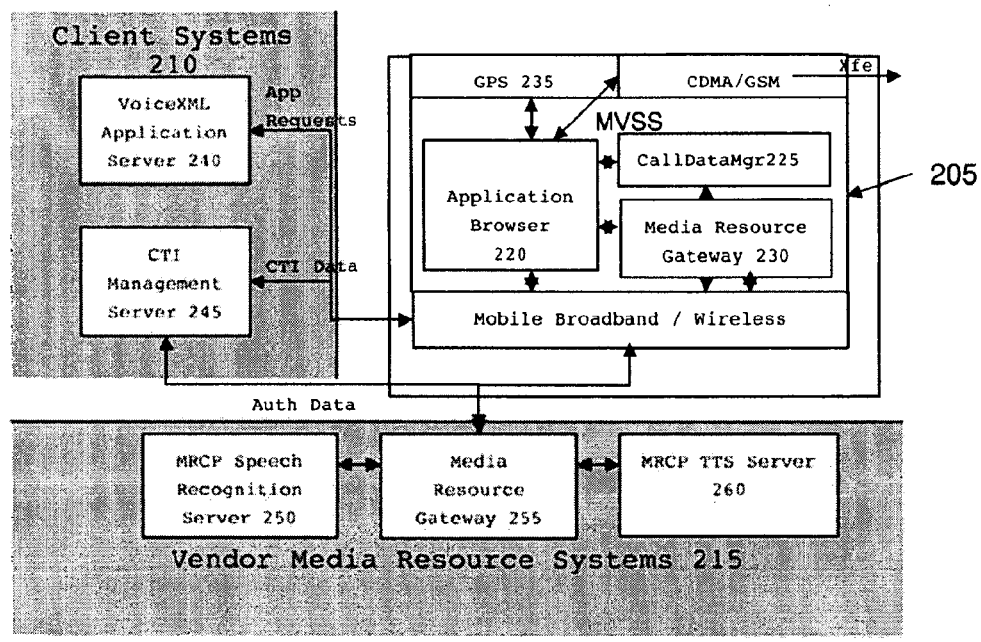
FIG. 2 illustrates a Mobile Voice Self Service (MVSS) system in accordance with an exemplary embodiment of the present invention.

FIG. 2 illustrates an MVSS system in accordance with an exemplary embodiment of the present invention.

The MVSS system shown in FIG. 2 illustrates a mobile device 205, client systems 210, and vendor media resource systems 215. An Application Browser 220 may interacts with a Call Data Manager 225 and a Media Resource Gateway 230, all of which may be included in the mobile device 205. The mobile device 205 may communicate with the client systems 210 or the service vendor's media resource systems 215 via a broadband or wireless connection. The mobile device 205 may be, for example, a cellular phone, a PDA, or an iPhone, and may operate, for example, in a CDMA or GSM network. The mobile device 205 may also include a GPS component 235 to provide, for example, location-based services to the user of the mobile device 205.

The client systems 210 may include a VoiceXML Application Server 240 and a CTI Management Server 245, whereas the vendor's media resources systems 215 may include an MRCP Speech Recognition Server 250, a Media Resource Gateway 255, and a MRCP TTS Server 260.

The Application Browser 220 of the mobile device 205 may be a VoiceXML 2.1 compliant browser with a minimal memory footprint and minimal processing overhead. Unlike the VoiceXML browsers used in a hosted environment in the related art, the Application Browser or VoiceXML browser 220 may only need to be able to handle one call. Therefore, the required processing power is significantly reduced. In addition, the VoiceXML browser 220 may be able to handle a majority of the call flow required to provide an IVR application to the user of the mobile device 205. The VoiceXML browser 220 may send application requests to the VoiceXML Application Server 240, and the requested VoiceXML application may be delivered from the VoiceXML Application Server 240 to the VoiceXML browser 220.

The Call Data Manager 225 may communicate important telephony events to the client systems 210, in particular to the CTI Management Server 245. Such telephony events may include, for example, set up, deliver (ringing), establish (answer), clear (hang up), end, hold, retrieve from hold, conference, transfer, forward, etc. When a legitimate call is being processed on the mobile device 205, the call data provided by the Call Data Manager 225 may be used, in conjunction with data of the VoiceXML Application Server 240, to authorize access to advanced MRCP features. The advanced MRCP features may include automatic speech recognition (ASR) that may be provided by the MRCP Speech Recognition Server 250 or Text-To-Speech (TTS) that may be provided by the MRCP TTS Server 260, for example. Proper authentication may be important because MRCP features may be charged per transaction by the vendor. Also, the Call Data Manager 225 may be important with respect to transfers. Transfers that usually depend on a carrier's advanced features may need to be implemented by other means, so it may be necessary for User-to-User Information (UUI) and other call data to be transferred out-of-band.

The Media Resource Gateway 255 may provide advanced services, such as ASR or TTS to the application, by bridging communication between the VoiceXML browser 220 and the MRCP services. As part of authorizing communication to media resources, MRCP requests from the VoiceXML browser 220 may be directed through the Media Resource Gateway 255. The gateway layer may handle authentication and then host the MRCP communication through the established channel. The MRCP Speech Recognition Server 250 may provide the ASR services to the VoiceXML browser 220, and the MRCP TTS Server 260 may provide the TTS services to the VoiceXML browser 220. If the mobile device 205 is capable of processing speech or generating TTS on its own, resources not requiring vendor-specific handling may be passed off to the mobile device 205 by the Media Resource Gateway 230 thereby saving the application provider additional advanced service fees.

To facilitate the configuration of MVSS components prior to running a VoiceXML document, a Mobile Voice Self Service configuration file may be used. This file may be an xml-based configuration file that contains the configuration settings of the Media Resource Gateway 230 and the Call Data Manager 225 as well as the URL of the intended VoiceXML target.

Having a unique file type for voice applications targeted to mobile devices may also be useful in allowing seamless integration of MVSS into a web environment. A mobile device may automatically launch the MVSS application when the user follows a link that provides MVSS content. The format of such a file may be defined, published and validated via standard xml validation methods.

Simple blind transfers may be accomplished by allowing the MVSS application to access the phone's system APIs (Application Programming Interfaces) to simply dial the transfer number. More complicated transfers may require functions that may be unavailable within the realm of the mobile device's capabilities on the mobile carrier's network. To implement these transfers may require dialing a toll-free number that has carrier-advanced features and then utilizing CTI data to execute the transfer.

The following may be exemplary applications of MVSS that may be advantageous to, for example, the end users, vendors, service providers, companies and clients involved.

With respect to access to IVR applications, in the case of MVSS, the user may be allowed to access applications via web URLs rather than phone numbers. A client's site may list individual URLs for each subsection of their application, giving the user direct access to billing or technical support features, without the need for the client to have individual phone numbers for each service. Having direct access to the VoiceXML interpretation allows the user to easily "pause" the IVR, and it may be relatively simple to provide a complete range of controls a user would normally be accustomed to with other media, such as fast forward, rewind, etc.

Figure 3:
FIG. 3 illustrates an MVSS VoiceXML Navigation situation in accordance with an exemplary embodiment of the present invention.

Instead of having to rely on the application's menu repeat options, the user may interact with the browser instructing it to scan through a prompt in reverse, go back to the beginning of the current prompt or menu, or even go to a previous menu and either accept the user's original response again or provide new input. To support such features, when it comes to application reporting, it may be beneficial to create new VoiceXML events that the browser can handle, so reporting can accurately reflect the user's navigation. FIG. 3 shows an exemplary illustration of MVSS VoiceXML Navigation.

Having direct access to the call flow data may allow implementing user-defined hotkeys or "bookmarks" in a VoiceXML application. If the user would like to return to a portion of an application at a later time, he or she may press a hotkey capture button, which may then suspend the running VoiceXML application. The MVSS browser may store the current state and the input required to reach that state. After speaking or entering a bookmark identifier, the application may resume normally. At a later time, the user may request access to the bookmark, and this may instruct MVSS to load the application and automatically proceed to the bookmarked state if modifications to the applications do not prevent it. In the case where the application has been modified, MVSS may provide a message to the user indicating the bookmark needs to be updated; present the user with the prompt where the application changed; and wait for the user to indicate that he or she has once again reached the point in the application the user wishes to bookmark.

Location-based services is another area in which having the MVSS browser running directly on the mobile device may be of advantage. Providing location-based information to customers may mean to add more value in the mobile realm. Rather than relying on complicated data exchanges to determine the location of the caller, the browser may directly access the device's GPS or tower based coordinates and pass them on to the application server. This may all be done as part of the initial request to the application server. Self-service applications may then be catered for the caller's current location prior to even the first prompt.

Figure 4:
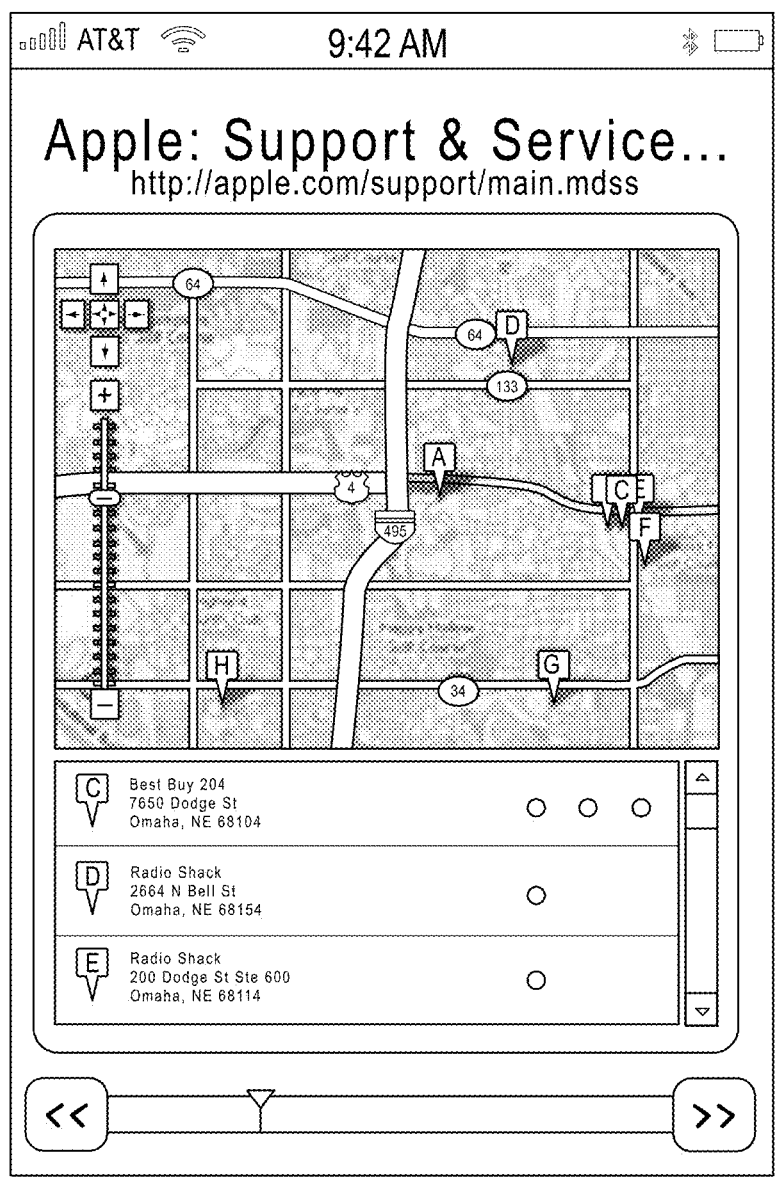
FIG. 4 illustrates incorporation of multimedia data into MVSS in accordance with an exemplary embodiment of the present invention.

Multimedia resources, as illustrated, for example, in FIG. 4, may be referenced within the VoiceXML application, allowing the mobile device to display supplemental data during the progress of the call. This may be utilized by providing an image of the caller's current billing statement when the caller requests payment information; by providing a video clip of the steps required to reset a satellite receiver when the caller is requesting technical support; or even by launching a web page with a registration form when the caller wants to enroll in some special program. There may also be the branding aspect that may be important to many companies, so a company logo, customer notifications, or advertising may be displayed on the mobile device while working with their IVR.

In the VoIP world, it may be common for a conference call to be presented along with video conferencing or a shared desktop for a presentation. MVSS may add functionality in the voice self-service world because the multimedia may also interact back with the IVR. For example, if the caller has a question about their bill, MVSS may display the caller's recent billing statement on the screen and allow the user to select the billing line-item the caller has a question about and say "What is this charge"? Again, due to the fact that the VoiceXML interpretation is happening locally on the caller's phone, the act of selecting an item on the screen may be passed to the browser as input without complex data exchanges. This sort of interaction may be simplified because MVSS is just a single system that accepts multiple forms of input.

MVSS technology may be an industry standard that may be implemented by mobile device builders as part of their devices' core features.

There may be several versions of MVSS to support various mobile device architectures. Open development environments like Java ME may aid in that sort of development, but each device may require its own special development for its unique features or hardware.

Figure 5:
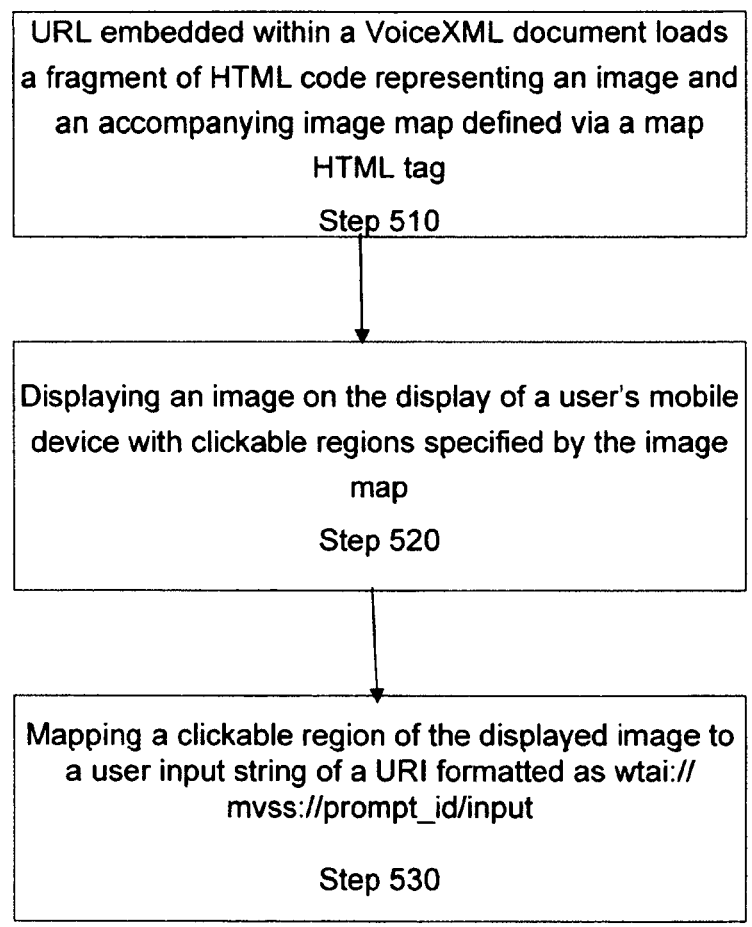
FIG. 5 illustrates incorporation of image map interactions in a VoiceXML application in accordance with an exemplary embodiment of the present invention.

Further, image map interactions as a means of accepting user input may be incorporated in a VoiceXML application. In FIG. 5, a URL embedded within a VoiceXML document may load 510 a fragment of HTML code representing an image and an accompanying image map defined via a map HTML tag. An image may be displayed 520 on the display of the user's mobile device with clickable regions that are specified by the image map. Therein, a clickable region of the displayed image may be mapped 530 to a user input string of a URI that may be formatted as, for example, wtai://mvss/prompt_id/input.

A prompt_id that is used in the clickable regions may be comprised of session information and a prompt identifier in order to associate a click event to the correct form input. Input provided for a clickable region may be either a DTMF tone represented as <dtmf-1> or a text string, for example. A URI with a protocol specified as wtai://mvss/ may be directed to the VoiceXML browser and processed internally by the browser.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A system, comprising:
   a Media Resource Control Protocol (MRCP) Speech Recognition Server operable to provide services to an application browser implemented on a Mobile Voice Self Service (MVSS) mobile device and process an application wherein the mobile device is a cellular telephone;
   a MRCP TTS Server to provide Text-To-Speech (TTS) services to the application browser implemented on the MVSS mobile device and process the application; and
   a Media Resource Gateway to facilitate communication of at least one of the MRCP Speech Recognition Server and the MRCP TTS Server with the application browser;
   wherein the MVSS mobile device comprises a call data manager to provide call data to the Media Resource Gateway that, in conjunction with data from an application server, authorize access to at least one of the MRCP Recognition Speech Server and the MRCP TTS Server.

2. The system as claimed in claim 1, wherein the application browser comprises a VoiceXML browser.

3. The system as claimed in claim 1, wherein the application comprises a VoiceXML application.

4. The system as claimed in claim 1, wherein the MRCP Speech Recognition Server is operable to provide Automatic Speech Recognition (ASR) services to the application browser implemented on the MVSS mobile device.

5. The system as claimed in claim 1, wherein the MVSS mobile device further comprises a Global Positioning System (GPS) component to provide location-based services to a user of the MVSS mobile device.

6. The system as claimed in claim 1, wherein the MVSS mobile device is operable in at least one of a Code Division Multiple Access (CDMA) network and a Global System for Mobile Communications (GSM) network.

7. The system as claimed in claim 1 comprising a client system, the client system comprising an application server to deliver the requested application to the application browser.

8. The system as claimed in claim 7, wherein the client system further comprises a CTI management server, and wherein the call data manager is operable to communicate telephony events associated with a telephone call of the MVSS mobile device to the CTI management server.

9. The system as claimed in claim 1, wherein the media resource gateway is operable to process MRCP requests from the application browser.

* * * * *